United States Patent Office 2,973,399
Patented Feb. 28, 1961

2,973,399

COUNTER CELL ELECTROLYTE

Eric F. Kujas, Philadelphia, Pa., assignor to The Electric Storage Battery Company, a corporation of New Jersey No Drawing. Filed Oct. 13, 1958, Ser. No. 766,717

7 Claims. (Cl. 136—155)

The present invention generally relates to counter electromotive force cells commonly known as counter cells. More specifically, the present invention is concerned with a new and improved alkaline electrolyte to use in counter cells.

A counter cell conventionally consists of two or more electrodes immersed in a suitable electrolyte and is utilized in an electrical circuit to produce an electromotive force or voltage which is counter to the flow of current in the circuit, a prime requisite being the lack of any capacity build-up in the cell. The function of this type of cell is similar to that of a resistor in that, by the use thereof, the voltage of the main circuit will be reduced to a desired lower value. Counter cells, however, differ from resistors in that they provide a voltage drop substantially independent of current flow, whereas the voltage drop across a resistor varies directly with the current flow therethrough.

In the past, counter cells of various types have been used. One such cell has consisted of lead or lead antimony alloy grids immersed in a solution of sulfuric acid but this type has been found objectionable in that a certain amount of capacity has been developed which caused an excessive flow of current when the cell was short circuited. Additionally, the grids tended to disintegrate and deposit sediment in the bottom of the cell. Counter cells currently in use are generally of the type having an alkaline electrolyte with sheet metal electrodes of nickel, stainless steel, and other like metals which are inert in the alkaline electrolyte when an electric current is passed therethrough. These cells are, however, subject to a serious defect in that the passage of current therethrough decomposes the water of the electrolyte into hydrogen and oxygen, which gases escape from the cell and necessitates periodic servicing to restore the electrolyte to its optimum condition. Furthermore, the alkaline electrolyte, generally a solution of potassium hydroxide, tends to absorb carbon dioxide from the atmosphere which reacts to form harmful carbonates in the cell.

In an effort to prevent loss of electrolyte and electrolyte contact with air, attempts have been made to seal counter cells. These attempts, however, have been effective only with cells having a limited amount of electrolyte, the latter being contained substantially within the pores of absorbent separators and within the pores of the electrodes themselves. The theory of operation of a sealed cell with a limited amount of electrolyte is that by limiting the amount of electrolyte to that necessary for ion transfer between the electrodes and to that amount necessary to provide a thin film covering the electrode pore walls, to maintain them highly chemically active, the effective surface of the electrodes is more readily available for direct combination with the gases liberated during the cell operation. In this manner, there is maintained within the cell a balanced system which provides for gas recombination at a rate which prevents an undue build-up of gas pressure within the cell.

While counter cells constructed in this manner have been to a degree satisfactory, they are expensive to manufacture and have limited current capacity. The principal problem encountered in the construction of sealed counter cells having limited amounts of electrolyte is the dissipation of heat generated within the cell during operation. In the conventional unsealed counter cell flooded with electrolyte, the electrolyte not only transfers heat from the electrodes to the cell casing for dissipation but because of its thermal capacity and volume, it also acts as a heat sink. When the amount of electrolyte within a cell is limited, there is not sufficient electrolyte available to contribute substantially in the dissipation of cell heat. As a result, the size and current capacity of such sealed counter cells is severely limited.

It is, therefore, an object of the present invention to provide a new and improved electrolyte for use in alkaline counter cells which will permit such cells to be sealed with excess amounts of electrolyte therein.

Another object of the present invention is to provide an electrolyte for a sealed counter cell which will permit the utilization of inexpensive and more rugged cell construction.

It is a further object of the present invention to provide a new and improved electrolyte for sealed counter cells which will permit the construction of larger sealed counter cells with higher current carrying capacities.

In accordance with the present invention, there is provided an electrolyte comprising a dilute solution of an alkali hydroxide such as potassium hydroxide or sodium hydroxide having present therein an iodine salt in concentrations ranging from 1 to 10 molar percent by weight of electrolyte. Any soluble iodine salt having anions compatible with cell operation may be utilized. While the mechanism which makes possible the operation of a sealed counter cell utilizing a non-critical amount of the electrolyte of the present invention is not fully understood, it may be partially explained by the establishment within the cell of an iodine cycle in preference with the normal oxygen cycle. If such a cycle is established, iodine ions present in the electrolyte are oxidized at the positive electrode and reduced at the negative electrode during cell operation. Since the oxidation potential of these ions is lower than the oxidation potential of oxygen, oxygen evolution is suppressed.

Other objects and advantages of the present invention will be apparent from the following detailed description of preferred embodiments thereof.

In carrying out one form of the present invention, an electrolyte is prepared by mixing together the following materials: 100 grams of potassium iodide, 100 grams of potassium hydroxide, and 400 grams of water. The molar composition of this electrolyte is potassium iodide—2.5%, potassium hydroxide—7.3%, and water—90.2%.

By way of illustration and example, the electrolyte prepared in accordance with the formula given above was introduced into a counter cell which heretofore was adapted for sealed operation only when electrolyte was present in a critical limited amount contained wholely within the pores of the electrodes and within the pores of the separators. Such a counter cell is described and claimed in the co-pending application of Clark R. Freas, Serial Number 546,610, filed November 14, 1955. This counter cell comprised 7 positive plates and 8 negative plates separated by microporous polyvinyl chloride separators of the type available commercially under the trade name "Pormax." The positive plates were unimpregnated porous sintered nickel plaques having no electrochemical capacity. The negative plates comprised plaques of porous sintered nickel impregnated with cadmium hydroxide in an amount which filled about 35% of the total electrode pore volume. The electrode structure described was placed in a suitable container which was then filled with the electrolyte of the present invention and the container sealed. The counter cell was then utilized as a voltage regulator with current rates much higher than had heretofore been possible without any substantial build-up of pressure within the cell. In addition, the cell provided voltage regulation that was in all respects equal to and in some respects better than that which has heretofore been available from either sealed or conventional unsealed counter cells.

The function of the iodide ion in the electrolyte of the present invention which permits the sealing of a counter cell with a non-critical amount of electrolyte therein can be seen by considering the following potentials of electrolyte reactions:

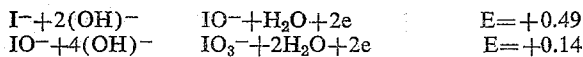

$$I^- + 2(OH)^- \rightarrow IO^- + H_2O + 2e \qquad E = +0.49$$
$$IO^- + 4(OH)^- \rightarrow IO_3^- + 2H_2O + 2e \qquad E = +0.14$$

The iodide ion oxidizes at the positive electrode to $IO_3^-$. The $IO_3^-$ formed diffuses to the negative and is there reduced back to $I^-$. The iodide ion is not corrosive and the oxidation to iodate is very fast and reversible. The potential which this reaction takes place is below the oxidation potential of oxygen and accordingly, that reaction is suppressed. It should be noted, however, that if the electrolyte of the present invention is utilized in a battery, that is, a system having electro-chemical capacity, the iodate ions present in the electrolyte after charging would cause discharge of the negative plate and thus, the self-discharge of a battery incorporating such an electrolyte would be extremely high.

In addition to potassium iodide, other iodine salts such as sodium iodide, lithium iodide or any soluble iodine salt having anions compatible with counter cell operation may be utilized as a source of iodide ions in the electrolyte of the present invention. Salts having anions compatible with counter cell operation include those salts whose anions will not plate out or in any other way take part in the electro-chemical reaction within the cell or become metallic impurities on either electrode. It will be obvious to those skilled in the art that sodium hydroxide may also be substituted for postassium hydroxide. Still further, it has been found that the molar composition of the electrolyte described may be varied with the iodine salt being present in concentrations ranging from 1 to 10 molar percent by weight of electrolyte.

Optimum performance, however, has been obtained with electrolytes having iodine salt concentrations of from 1½ to 4%. It will also be obvious to those skilled in the art that while the electrolyte of the present invention has been illustrated in connection with a counter cell of specific construction, that it is equally adapted for use in all types of alkaline counter cells including those having electrodes of sheet nickel, stainless steel, sintered nickel, and other like metals which are inert in alkaline electrolytes.

Having described the present invention, what is claimed as new is:

1. In a counter cell, an alkaline electrolyte containing an iodine salt in an amount ranging from about 1 to 10 molar percent.

2. In a counter cell, an alkaline electrolyte containing a salt selected from the group consisting of potassium iodide, sodium iodide, magnesium iodide, and lithium iodide in an amount ranging from about 1 to 10 molar percent.

3. In a counter cell, an electrolyte of the alkali hydroxide group containing an iodine salt in an amount ranging from about 1.5 to 4 molar percent.

4. In a counter cell, an aqueous electrolyte composed substantially of 16.66% potassium iodide, 16.66% potassium hydroxide and 66.67% water.

5. In a counter cell, an electrolyte comprising a dilute solution of potassium hydroxide containing potassium iodide in an amount ranging from about 1 to 10 molar percent.

6. A sealed alkaline counter cell containing an electrolyte of the alkali hydroxide group containing an iodine salt in an amount ranging from about 1 to 10 molar percent.

7. A sealed counter cell having electrodes selected from the group consisting of nickel and stainless steel and having an alkaline electrolyte containing an iodine salt in an amount ranging from about 1 to 10 molar percent.

References Cited in the file of this patent

UNITED STATES PATENTS

| | | |
|---|---|---|
| 1,902,081 | Kershaw et al. | Mar. 21, 1933 |
| 2,040,255 | Gordon | May 12, 1936 |
| 2,050,174 | Gordon | Aug. 4, 1936 |